US007643720B2

(12) United States Patent
Kim et al.

(10) Patent No.: US 7,643,720 B2

(45) Date of Patent: Jan. 5, 2010

(54) OPTOELECTRONIC MODULE RETENTION MECHANISM

(75) Inventors: Daehwan Daniel Kim, Sunnyvale, CA (US); Joshua Moore, Sunnyvale, CA (US)

(73) Assignee: Finisar Corporation, Sunnyvale, CA (US)

(*) Notice: Subject to any disclaimer, the term of this patent is extended or adjusted under 35 U.S.C. 154(b) by 0 days.

(21) Appl. No.: 11/738,373

(22) Filed: Apr. 20, 2007

(65) Prior Publication Data

US 2008/0248683 A1 Oct. 9, 2008

Related U.S. Application Data

(60) Provisional application No. 60/910,793, filed on Apr. 9, 2007.

(51) Int. Cl.

| | |
|---|---|
| ***G02B 6/00*** | (2006.01) |
| ***G02B 6/42*** | (2006.01) |
| ***H01R 13/62*** | (2006.01) |
| ***H01R 4/48*** | (2006.01) |

(52) U.S. Cl. ......................... 385/134; 385/89; 439/160; 439/153; 439/345

(58) Field of Classification Search ....................... None

See application file for complete search history.

(56) References Cited

U.S. PATENT DOCUMENTS

| | | | | |
|---|---|---|---|---|
| 6,746,158 | B2 * | 6/2004 | Merrick | 385/53 |
| 6,824,416 | B2 * | 11/2004 | Di Mascio | 439/352 |
| 6,908,323 | B2 * | 6/2005 | Ice | 439/160 |
| 6,991,481 | B1 * | 1/2006 | Guan et al. | 439/160 |
| 7,083,336 | B2 * | 8/2006 | Kim et al. | 385/92 |
| 7,264,406 | B1 * | 9/2007 | Yoshikawa | 385/88 |
| 7,347,711 | B1 * | 3/2008 | Bianchini et al. | 439/357 |

FOREIGN PATENT DOCUMENTS

JP 2006178021 A * 7/2006

OTHER PUBLICATIONS

Moore, Joshua, Latching Mechanism for a Module, U.S. Appl. No. 11/830,674, filed Jul. 30, 2007.

* cited by examiner

*Primary Examiner*—Omar Rojas

(74) *Attorney, Agent, or Firm*—Workman Nydegger

(57) ABSTRACT

A retention mechanism for an electronic or optoelectronic module. In one example embodiment, an optoelectronic module retention clip includes a base, a pair of arms extending from the base, and a protrusion extending from each arm. Each protrusion is configured to engage a complementary structure defined in a de-latch slide and a complementary structure defined in an optoelectronic module shell so as to prevent motion of the de-latch slide relative to the shell when the optoelectronic module retention clip is attached to the optoelectronic module.

26 Claims, 8 Drawing Sheets

OPTOELECTRONIC MODULE RETENTION MECHANISM

CROSS-REFERENCE TO RELATED APPLICATION

This application claims priority to U.S. Provisional Patent Application Ser. No. 60/910,793, filed on Apr. 9, 2007, which is incorporated herein by reference in its entirety.

BACKGROUND

Optoelectronic modules, such as optoelectronic transceiver or transponder modules, are increasingly used in electronic and optoelectronic communication. Some electronic and optoelectronic modules can be plugged into a variety of host devices. Multi-Source Agreements ("MSAs"), such as the SFF MSA, the SFP MSA, the SFP+ (IPF) MSA, and the XFP MSA, specify, among other things, package dimensions for electronic and optoelectronic modules. Conformity with an MSA allows an electronic or optoelectronic module to be plugged into host devices designed in compliance with the MSA. Optoelectronic modules typically communicate with a printed circuit board of a host device by transmitting electrical signals to the printed circuit board and receiving electrical signals from the printed circuit board. These electrical signals can then be transmitted by the optoelectronic module outside the host device as optical signals.

One common difficulty associated with optoelectronic modules concerns the retention and removal of the optoelectronic modules within and from corresponding cages of host devices. Although various mechanisms have been developed in order to facilitate the retention and removal of optoelectronic modules within and from corresponding cages of host devices, these mechanisms can be problematic in certain applications. For example, the XFP MSA specifies a bail-actuated latch mechanism that facilitates the removal of an XFP optoelectronic module from a cage of a host device without the use of a separate tool. The bail-actuated latch mechanism can also include certain visible indicators that serve to identify one or more characteristics, such as wavelength or data rate, of the XFP optoelectronic module. The bail-actuated latch mechanism specified in the XFP MSA also provides, among other things, electromagnetic interference containment by helping to prevent the emission of electromagnetic radiation from within the XFP optoelectronic module.

Although enabling the removal of an XFP optoelectronic module from a cage of a host device without necessitating the use of a separate tool is generally desirable, certain applications, sometimes known as "single-insertion" applications, may require that the XFP optoelectronic module only be removed from a cage of a host device by use of a separate tool. Requiring a separate tool to remove an XFP optoelectronic module from a cage of a host device can increase the likelihood, for example, that the module is only removed from the cage by the original manufacturer or vendor of the host device and not by an end user of the host device.

One approach to designing an XFP optoelectronic module that is appropriate for a single-insertion application is to eliminate, entirely, a bail-actuated latch mechanism from the XFP optoelectronic module. This approach, however, also results in the undesirable elimination of the visible indicators of the bail-actuated latch mechanism that serve to identify characteristics of the XFP optoelectronic module. The elimination of these visible indicators can make the identification of characteristics of the XFP optoelectronic module, such as wavelength or data rate, burdensome. This approach can also result in the undesirable elimination of the electromagnetic interference containment properties of the bail-actuated latch mechanism, which can result in increased emission of electromagnetic radiation from the XFP optoelectronic module.

SUMMARY OF SOME EXAMPLE EMBODIMENTS

In general, example embodiments of the invention relate to a retention mechanism for an optoelectronic module. In one example embodiment, the example retention mechanism can be used to retain an optoelectronic module, to which the retention mechanism is attached, within a cage of a host device. When a retention clip of the retention mechanism is detached from the optoelectronic module, the optoelectronic module can be removed from cage of the host device. In one example embodiment, at least a portion of the example retention mechanism can include indicators, such as visible indicators, that serve to identify characteristics of the optoelectronic module to which the retention mechanism is attached.

In one example embodiment, an optoelectronic module retention clip includes a base, a pair of arms extending from the base, and a protrusion extending from each arm. Each protrusion is configured to engage a complementary structure defined in a de-latch slide and a complementary structure defined in an optoelectronic module shell so as to prevent motion of the de-latch slide relative to the shell when the optoelectronic module retention clip is attached to the optoelectronic module.

In another example embodiment, an optoelectronic module retention clip includes a base, a pair of arms extending from the base, a protrusion extending from each arm, and a visible indicator included on at least a portion of the body or one of the arms. Each protrusion is configured to engage a complementary structure defined in a de-latch slide and a complementary structure defined in an optoelectronic module shell so as to prevent motion of the de-latch slide relative to the shell when the optoelectronic module retention clip is attached to the optoelectronic module. The visible indicator indicates information concerning a characteristic of the optoelectronic module.

In yet another example embodiment, an optoelectronic module includes a shell, a transmit port defined in the shell, a receive port defined in the shell, and a retention mechanism. The retention mechanism includes a de-latch slide slidably attached to the shell and a retention clip. The de-latch slide has a latched position and a de-latched position. When the de-latch slide is moved to the de-latched position, one or more wedges of the de-latch slide are configured to disengage retention tabs of a cage of a host device from corresponding engagement structures of the shell. The retention clip includes a base, a pair of arms extending from the base, and a protrusion extending from each arm. Each protrusion is configured to engage a complementary structure defined in the de-latch slide and a complementary structure defined in the shell so as to maintain the de-latch slide in the latched position when the retention clip is attached to the optoelectronic module.

These and other aspects of example embodiments of the present invention will become more fully apparent from the following description and appended claims.

BRIEF DESCRIPTION OF THE DRAWINGS

To further clarify certain aspects of the present invention, a more particular description of the invention will be rendered by reference to example embodiments thereof which are disclosed in the appended drawings. It is appreciated that these drawings depict only example embodiments of the invention and are therefore not to be considered limiting of its scope. Aspects of the invention will be described and explained with additional specificity and detail through the use of the accompanying drawings in which.

DETAILED DESCRIPTION OF SOME EXAMPLE EMBODIMENTS

Example embodiments of the present invention relate to a retention mechanism for an optoelectronic module. When attached to an optoelectronic module, the example retention mechanism can be used to retain the optoelectronic module positioned within a cage of a host device. When a retention clip of the retention mechanism is detached from the optoelectronic module, the optoelectronic module can be removed from cage of the host device. In one example embodiment, at least a portion of the example retention mechanism can include indicators, such as visible indicators, that serve to identify characteristics of the optoelectronic module to which the retention mechanism is attached.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

1. Example Optoelectronic Module

Figure 1A:
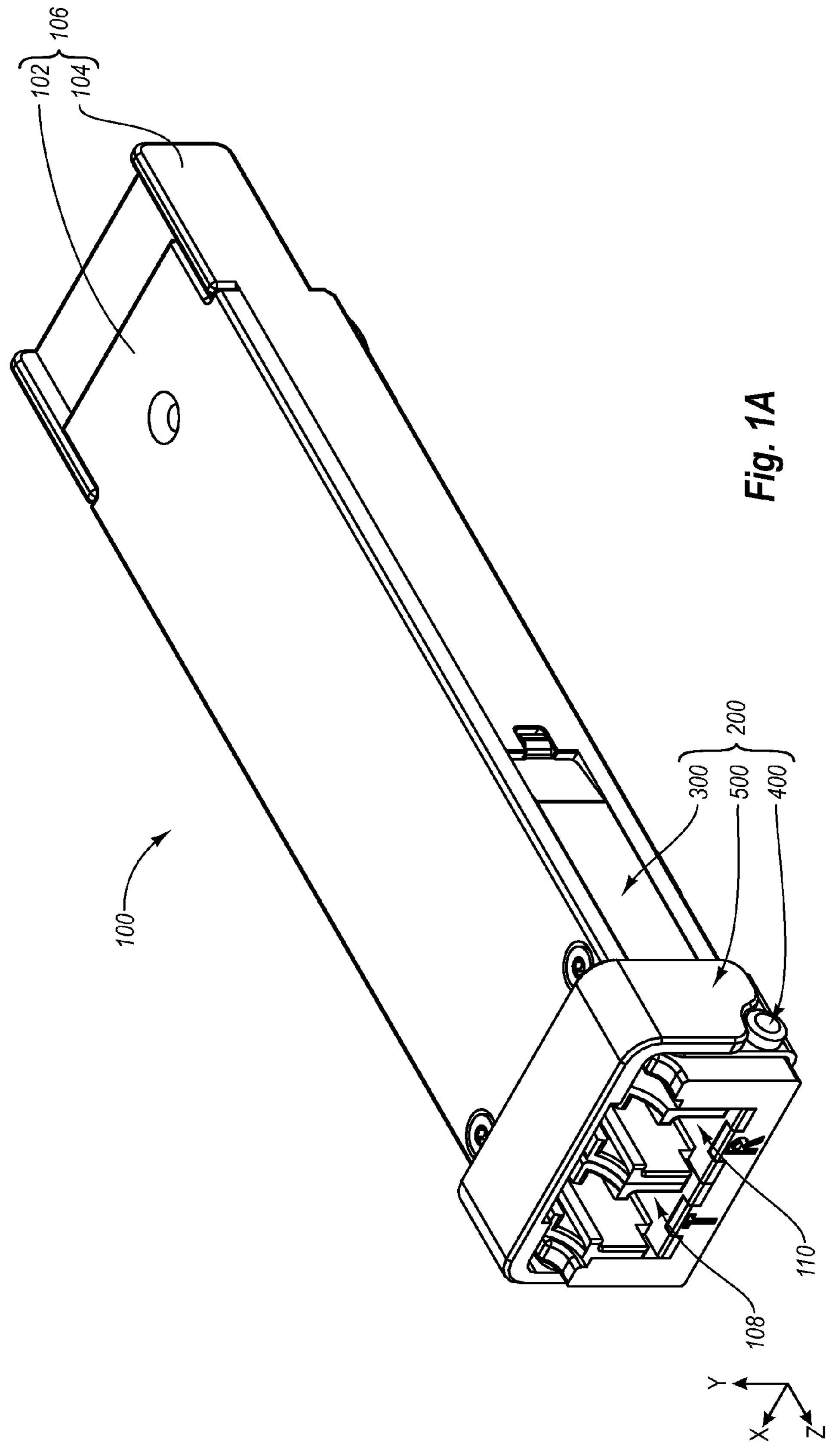
FIG. 1A is a top front perspective view of an example optoelectronic module, that includes an example retention mechanism.
Figure 1B:
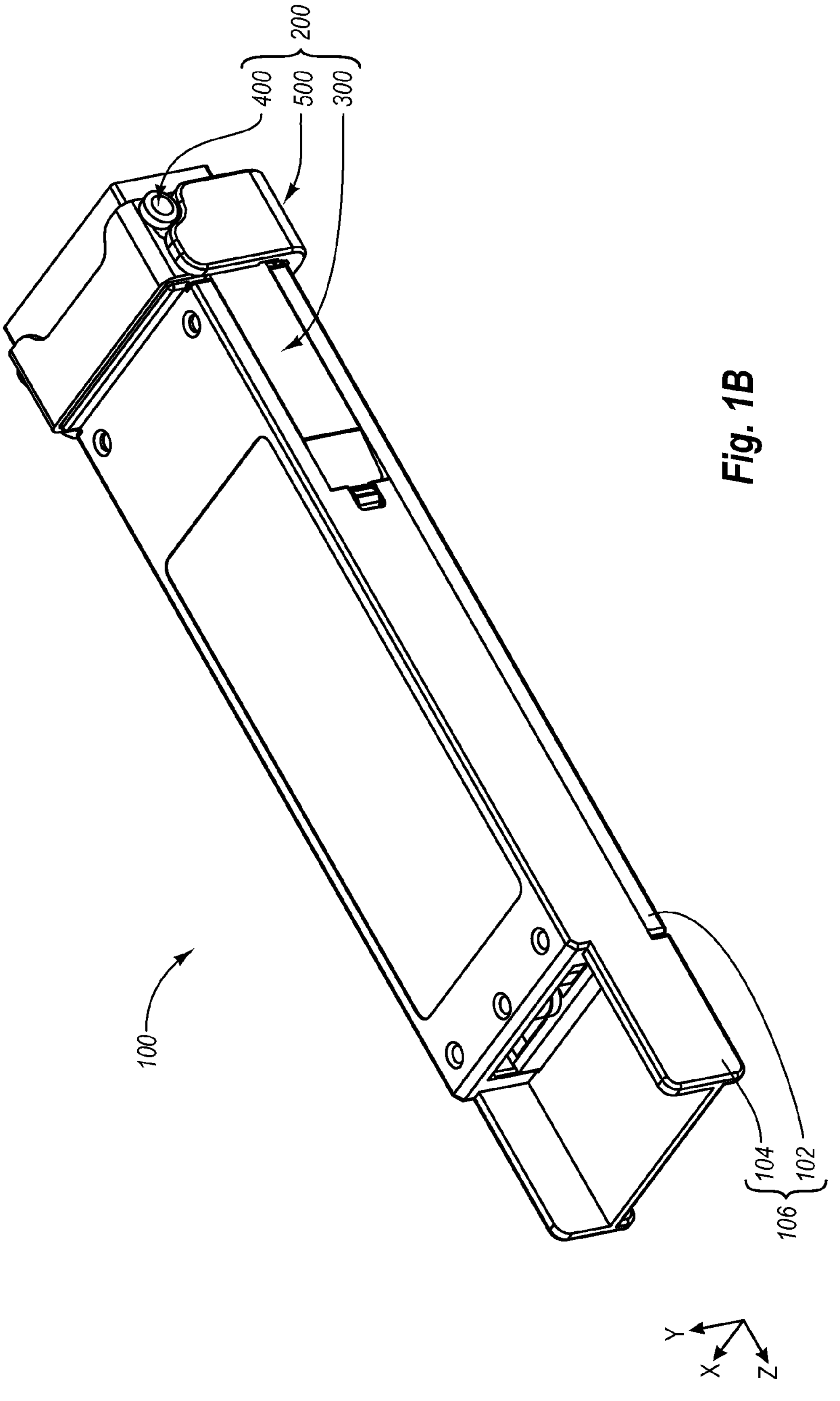
FIG. 1B is a bottom rear perspective view of the example optoelectronic module of FIG. 1A.

Reference is first made to FIGS. 1A-1B which disclose an example optoelectronic module 100 for use in transmitting and receiving optical signals in connection with a host device (not shown). As disclosed in FIGS. 1A and 1B, the module 100 includes various components, including a top shell 102 and a bottom shell 104 that together form a shell 106, and a transmit port 108 and a receive port 110 defined in the bottom shell 104. The top shell 102 and the bottom shell 104 can be formed using a die casting process. One example material from which the top shell 102 and the bottom shell 104 can be die cast is zinc, although the top shell 102 and the bottom shell 104 may alternatively be die cast, or otherwise manufactured, from other suitable materials.

The module 100 can be configured for optical signal transmission and reception at a variety of data rates including, but not limited to, 1 Gb/s, 2 Gb/s, 2.5 Gb/s, 4 Gb/s, 8 Gb/s, 10 Gb/s, or higher. Furthermore, the module 100 can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm. Further, the module 100 can be configured to support various communication protocols including, but not limited to, Fast Ethernet, Gigabit Ethernet, 10 Gigabit Ethernet, and 1×, 2×, 4×, and 10× Fibre Channel. In addition, although one example of the module 100 is configured to have a form factor that is substantially compliant with the XFP MSA, the module 100 can alternatively be configured in a variety of different form factors that are substantially compliant with other MSAs including, but not limited to, the SFF MSA, the SFP MSA, or the SFP+ (IPF) MSA. Finally, although the module 100 is an optoelectronic transceiver module, example embodiments of the present invention can alternatively be implemented in optoelectronic transponder modules, electronic transceiver modules, or electronic transponder modules.

2. Example Retention Mechanism

Figure 1C:
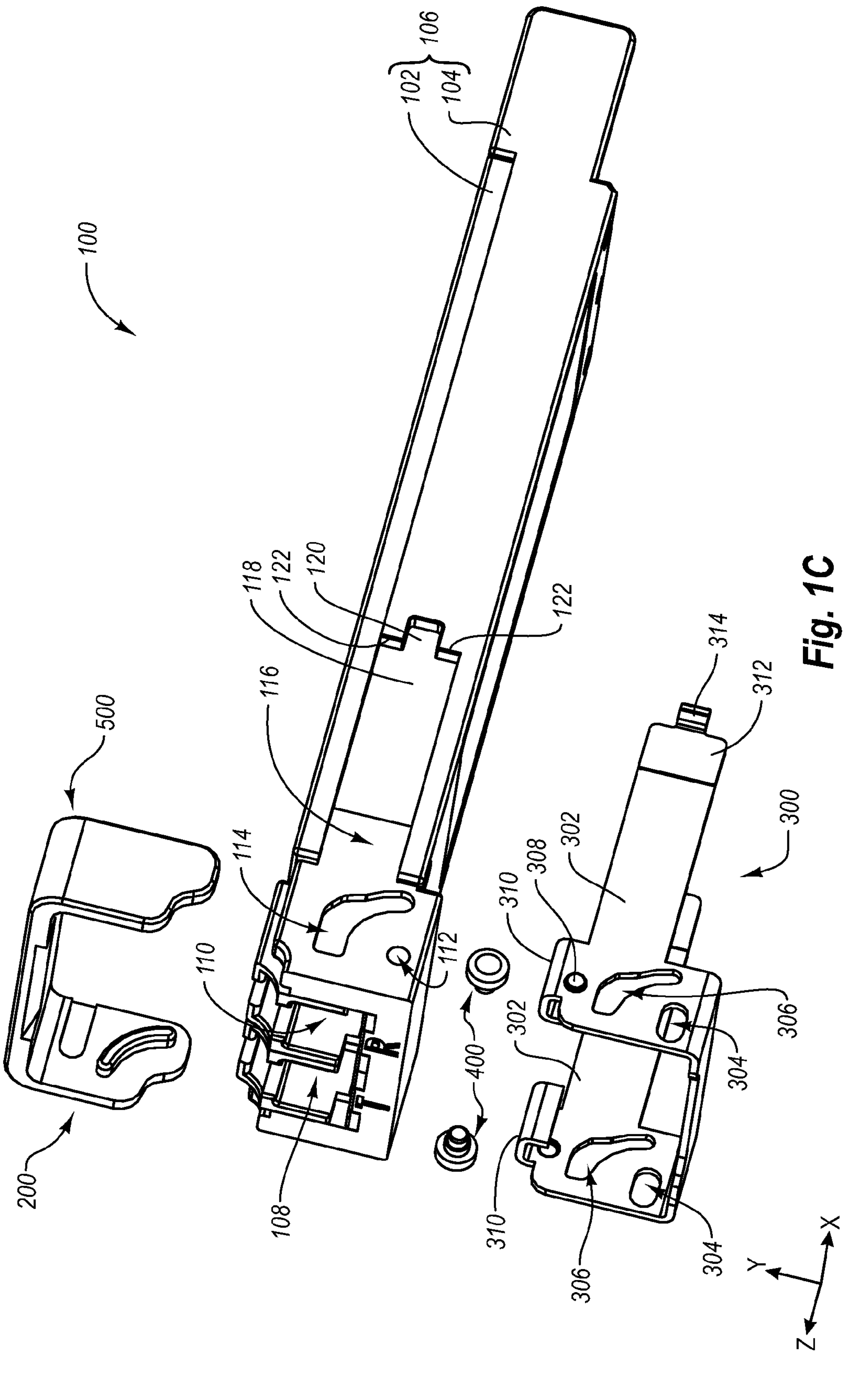
FIG. 1C is an exploded front perspective view of the example optoelectronic module of FIGS. 1A and 1B.

With continued reference to FIGS. 1A and 1B, and with reference also to FIG. 1C, the module 100 includes a retention mechanism 200 having a de-latch slide 300, a pair of pins 400, and a retention clip 500. Aspects of each of the components that make up the retention mechanism 200 will be disclosed in turn.

As disclosed in FIG. 1C, the example de-latch slide 300 of the example retention mechanism 200 includes slide arms 302, pin holes 304, retention holes 306, protrusions 308, slide guides 310 extending inward from the slide arms 302, and inverted portions 312 and wedges 314 defined on one end of the slide arms 302. The bottom shell 104 includes corresponding structures that enable the de-latch slide 300 to be slidably attached to the bottom shell 104. These corresponding structures include pin holes 112, retention recesses 114, grooves 116, inverted recesses 118, and recesses 120. The bottom shell 104 also includes shoulders 122 configured to engage retention tabs of a cage of a host device (see tabs 610 of cage 600 in FIG. 3A).

During assembly of the module 100, the example de-latch slide 300 is fit over a front portion of the bottom shell 104. When properly positioned, the pin holes 304 align with the pin holes 112, the slide arms 302 are positioned within the grooves 116, the inverted portions 312 are positioned within the inverted recesses 118, and the wedges 314 are positioned within the recesses 120. Subsequently, the pins 400 are inserted through the pin holes 304 into the pin holes 112. The pins 400 can be secured within the pin holes 112 in various ways including, for example, screwing, gluing, or soldering. The elongated natures of the pin holes 304 allows the de-latch slide 300 to be slid forward (away from the cage) and backward (toward the cage) along the z axis of the module 100. As disclosed in greater detail below in connection with FIG. 3A, sliding the de-latch slide 300 forward allows the wedges 314 to engage corresponding retention tabs of a cage of a host device (see tabs 610 of cage 600 in FIG. 3A) in order to disengage the retention tabs from shoulders 122 defined in the bottom shell 104, thereby allowing the module 100 to be removed from the cage.

With continuing reference to FIGS. 1A-1C, and with reference now to FIGS. 2A-2D, additional aspects of the example retention clip 500 are disclosed. The example retention clip 500 can be formed from any suitable flexible material including, but not limited to, rubber, stainless steel, metal, or plastic such as polyamide 66 (PA66), Ultem®(amorphous thermoplastic polyetherimide (PEI)), polycarbonate, or acrylonitrile butadiene styrene (ABS). One method by which the retention clip 500 can be formed is injection molding, although other manufacturing processes can alternatively be employed. Further, the retention clip 500 can be formed as a monolithic component, or formed as a composite component that is assembled from multiple components. In addition, at least some portion of the example retention clip 500 can include, be formed from, or be coated with, one or more visible indicators that serve to identify characteristics of the module 100.

The visible indicators of the example retention clip 500 can include, for example, color-coded portions, raised or depressed characters, printed characters, or any other visible indicator that can serve to identify characteristics of the module 100. The term "characters" as defined herein refers to letters, numbers, punctuation, any other symbol, and any combination thereof. The characteristics of the module 100 that can be identified by the visible indicators of the retention clip 500 can include, but are not limited to, the data rate, wavelength, communication protocol, form factor, manufacturer, or vendor of the module 100.

In one example embodiment, a single visible indicator of the retention clip 500 can serve to identify a single characteristic of the module 100. In another example embodiment, a single visible indicator of the retention clip 500 can serve to identify multiple characteristics of the module 100. In yet another example embodiment, the retention clip 500 can include multiple visible indicators that each serve to identify one or more characteristics of the module 100.

Figure 2B:
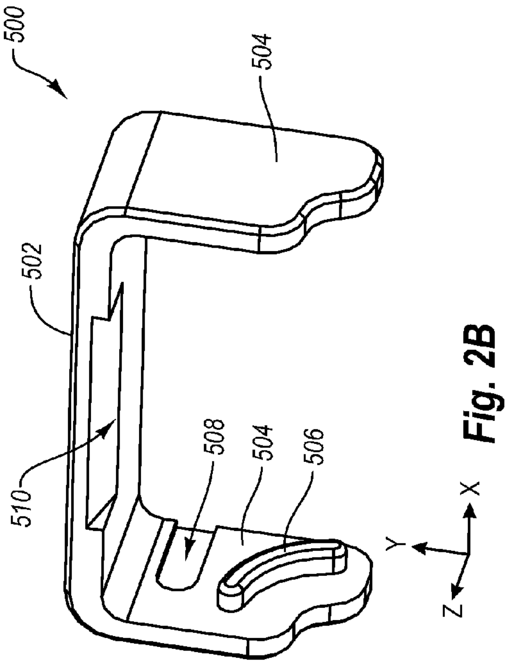
FIG. 2B is a front bottom perspective view of the example retention clip of FIG. 2A.
Figure 2D:
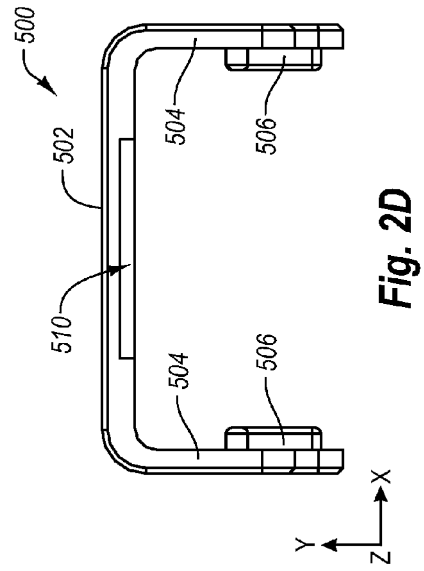
FIG. 2D is a front view of the example retention clip of FIGS. 2A-2C.
Figure 2A:
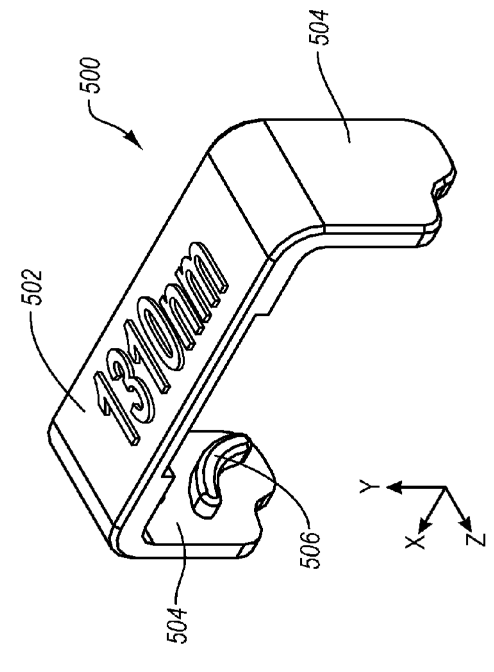
FIG. 2A is a front top perspective view of the example retention clip of FIGS. 1A-1C.
Figure 2C:
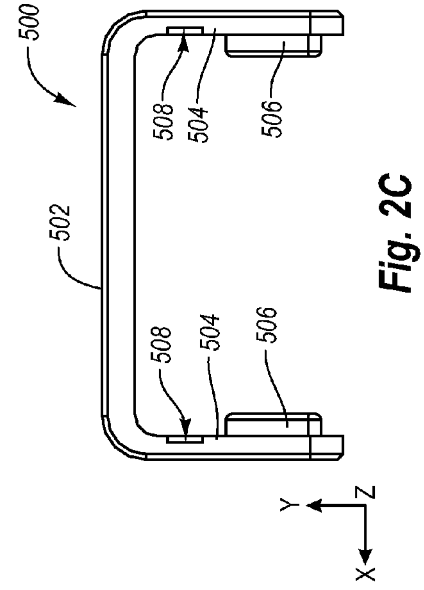
FIG. 2C is a rear view of the example retention clip of FIGS. 2A and 2B.

In one example embodiment, the retention clip 500 can be formed from, or coated with, a black material if the module 100 has a wavelength of 1310 nm. As another example, if the module 100 has a wavelength of 1610 nm, the retention clip 500 can be formed from, or coated with, a blue material. In another example, the retention clip 500 can include raised characters that indicate the wavelength of the module 100 (as shown in FIG. 2A).

In general, the retention clip 500 is configures to interact with the structure of the module 100 so as to maintain the module 100 in a cage of a host device until such time as the retention clip 500 is removed. More specifically, when attached to the module 100, as disclosed in FIGS. 1A and 1B, the example retention clip 500 prevents the de-latch slide 300 from being slid forward, thereby preventing the module 100 from being removed a cage of a host device (such as the example cage 600 disclosed in FIG. 3A, a discussed below).

As disclosed in FIGS. 2A-2D, the example retention clip 500 includes a base 502, a pair of arms 504 extending from the base, a curved protrusion 506 extending from each arm 504, a pair of recesses 508 defined in each arm 504, and a recess 510 defined in the base 502. This particular arrangement of the example retention clip 500 is configured to interact with components of a retention mechanism of an XFP module, but the retention clip 500 can be configured as necessary to interact with other module types, and the example retention clip 500 is not limited to this example arrangement.

With continuing reference to FIGS. 1C and 2A-2D, each of the protrusions 506 is sized and configured to extend through a corresponding retention hole 306 (defined in the de-latch slide 300) and a corresponding retention recesses 114 (defined in the bottom shell 104). Each of the recesses 508 is sized and configured to receive one of the protrusions 308 (defined in the slide arms 302). As disclosed in FIG. 3D, the recess 510 is sized and configured to receive a latch portion 702 of each of a pair of optical connectors 700 that are removably received into the transmit and receive ports 108 and 110, respectively.

The retention clip 500 can be attached to the module 100 by temporarily flexing the arms 504 away from each other and slipping the retention clip 500 over the corresponding portion of the bottom shell 104. After properly aligning the retention clip 500 over the bottom shell 104, the arms 504 of the retention clip 500 can be released in order to allow the retention protrusions 506 to engage the retention holes 306 of the de-latch slide 300 and the retention recesses 114 of the bottom shell 104, as disclosed below in FIG. 3B.

Similarly, the retention clip 500 can be detached from the module 100 by inserting a thin tool, such as a flathead screwdriver, between the bottom shell 104 and one of the arms 504 of the retention clip 500, and prying the arm 504 away from the bottom shell 104. The flexible nature of the retention clip 500 will enable the arm 504 to be temporarily flexed outward, thus allowing the disengagement of the retention protrusion 506 from the retention recess 114 and the retention hole 306, after which the retention clip 500 can be rotated away from the module 100, as disclosed in FIG. 3C.

3. Example Retention Mechanism Operation

Figure 3A:
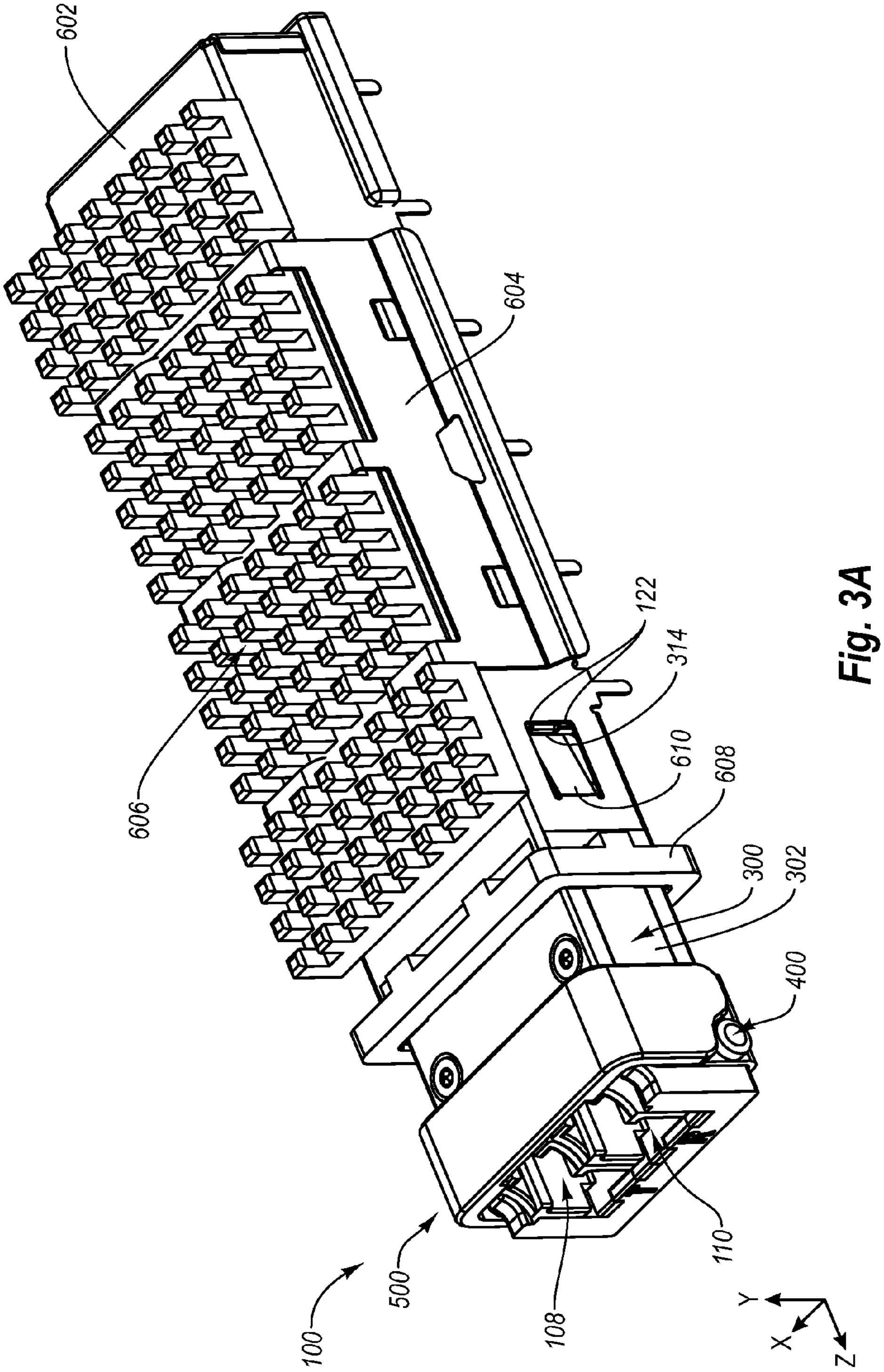
FIG. 3A is a front perspective view of the example optoelectronic module and retention mechanism of FIGS. 1A-1C, showing a portion of the example optoelectronic module positioned within an example cage corresponding to an example host device.
Figure 3B:
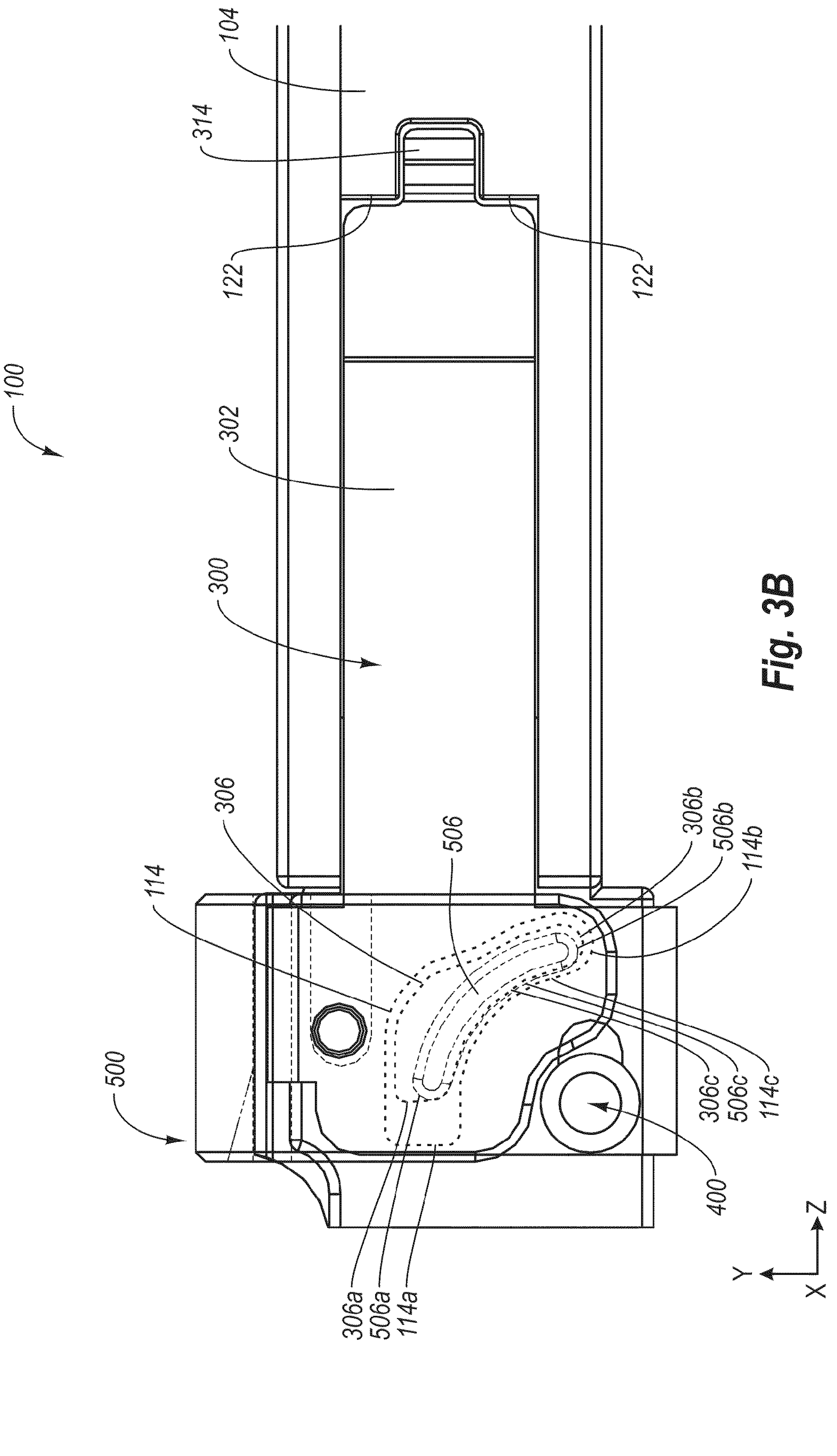
FIG. 3B is a side view of the example optoelectronic module of FIG. 3A.
Figure 3C:
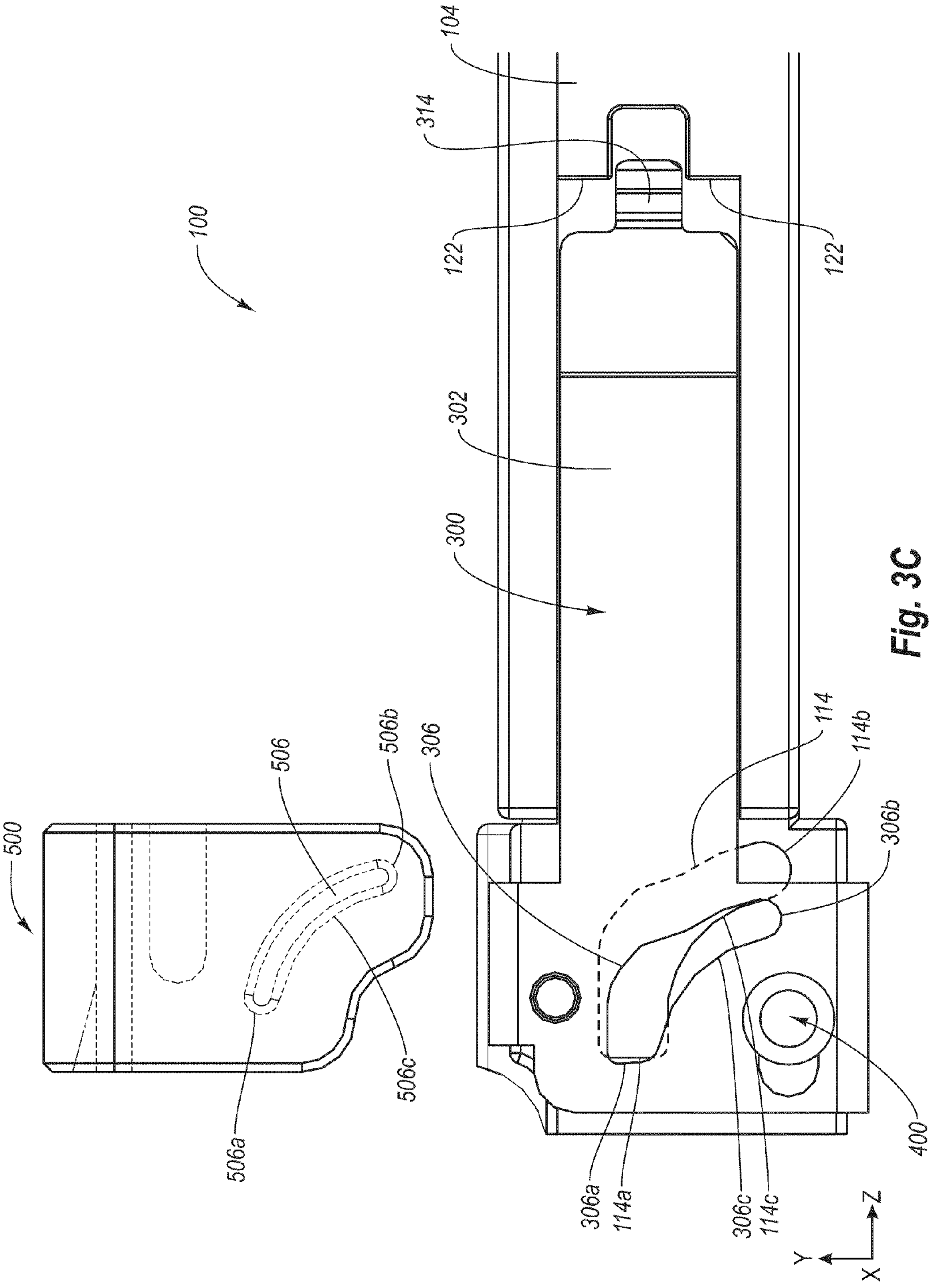
FIG. 3C is an exploded side view of the example optoelectronic module of FIG. 3B with the example retention clip of FIG. 3B detached from the example optoelectronic module.
Figure 3D:
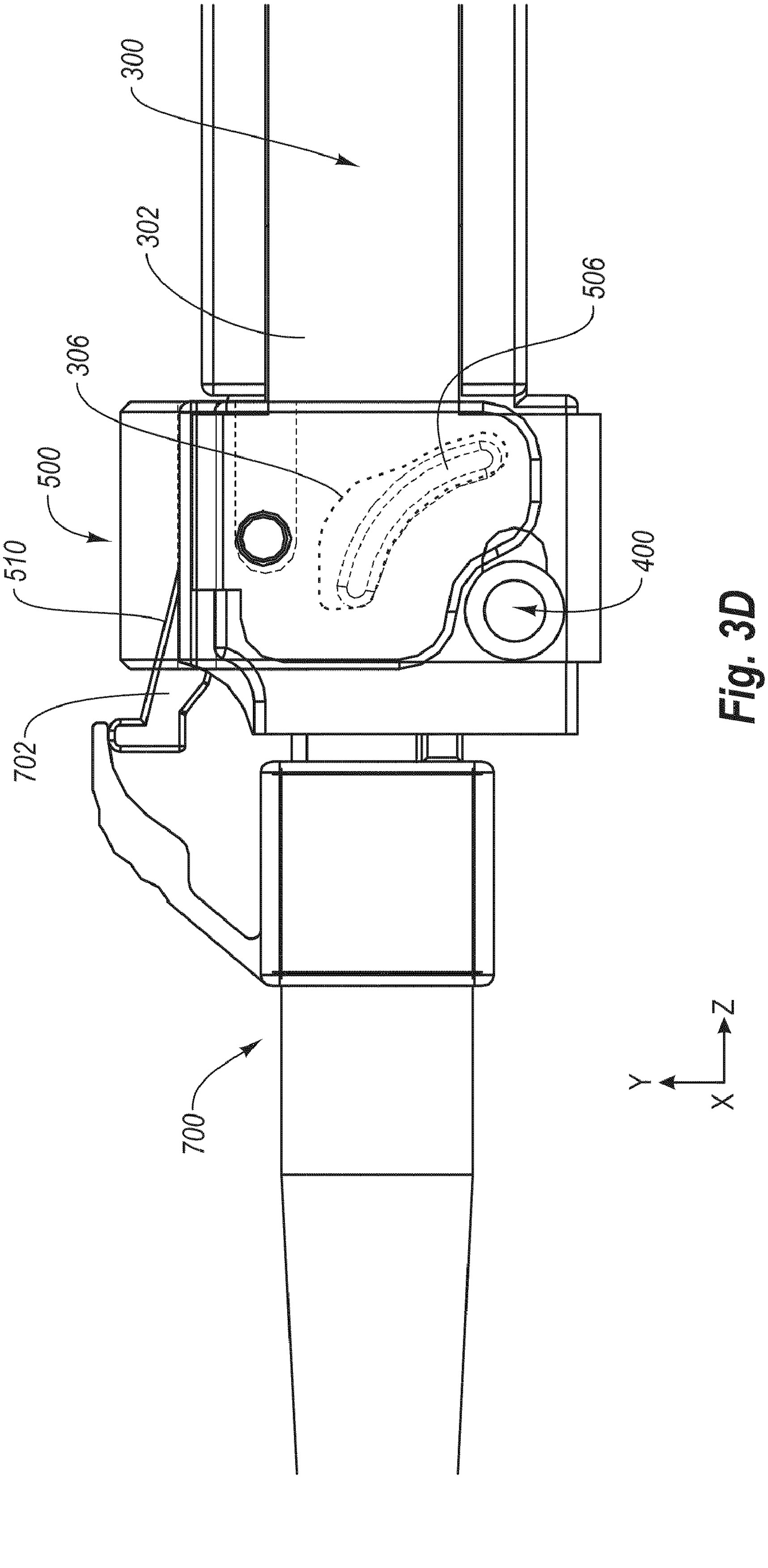
FIG. 3D is a side view of the example optoelectronic module of FIG. 3A with a pair of example connectors removably received in the optoelectronic module.

With particular reference now to FIGS. 3A-3C, aspects of the operation of the example retention mechanism 200 are disclosed. As disclosed in FIG. 3A, the example module 100 is sized and configured to be inserted into a cage 600 of a host device (not shown). The cage 600 includes, among other components, a housing 602, a sleeve 604, a heat sink 606; and an EMI sleeve 608. The cage 600 is configured to facilitate the electrical connection between a printed circuit board (not shown) of the module 100 and a printed circuit board (not shown) of the host device (not shown) to which the cage 600 corresponds. The EMI sleeve 608 is configured to help prevent the emission of electromagnetic radiation from the module 100. As disclosed in FIG. 3A, the slide arms 302 of the de-latch slide 300 make contact with the EMI sleeve 608, and can be made from an electronically conductive material in order to help prevent the emission of electromagnetic radiation. If the de-latch slide 300 were removed from the module 100, its absence would allow electromagnetic radiation to be emitted where the arms of the de-latch slide 300 were previously present.

With continuing reference to FIG. 3A, the housing 602 of the cage 600 also includes retention tabs 610. The retention tabs 610 are biased inward toward the module 100 such that the retention tabs 610 naturally engage with the shoulders 122 defined in the bottom shell 104 of the module 100, and thereby prevent the removal of the module 100 from the cage 600. The tabs 610 are also positioned to be flexed outward by the wedges 314 of the de-latch slide 300 when the de-latch slide 300 is slid forward along the z axis toward the front of the module 100 (away from the cage 600) to a de-latched position. However, as mentioned above, and as disclosed in FIG. 3A, the attachment of the retention clip 500 to the module 100 maintains the de-latch slide 300 in a latched position by preventing the de-latch slide 300 from being slid forward to a de-latched position. Thus, the module 100 can not be removed from the cage 600 while the retention clip 500 is attached to the module 100.

With continued reference to FIG. 3A, and with reference also to FIG. 3B, additional aspects of the retention clip 500 are disclosed. The semi-transparent view of the retention clip 500 that is disclosed in FIG. 3B shows the protrusion 506 of the retention clip 500 positioned within both the retention hole 306 of the de-latch slide 300 and the retention recess 114 of the bottom shell 104. As disclosed in FIG. 3B, a distal portion 506*a* of the protrusion 506 is positioned proximate a distal portion 306*a* of the retention hole 306, a distal portion 506*b* of the protrusion 506 is positioned proximate a distal portion 306*b* of the retention hole 306, and a side portion 506*c* of the protrusion 506 is positioned proximate a side portion 114*c* of the retention recesses 114. The positioning of the distal portion 306*a* and 306*b* proximate the distal portions 506*a* and 506*b* prevents the retention clip 500 from being rotated relative to the bottom shell 104. Further, the positioning of the side portion 506*c* proximate the side portion 114*c* maintains the de-latch slide 300 in a latched position and prevents the de-latch slide 300 from being slid forward toward the front of the module 100 to a de-latched position. More specifically, while the retention clip 500 is attached through the de-latch slide 300 to the module 100, the wedges 314 are prevented from flexing the tabs 610 outward. Thus, the attachment of the retention clip 500 to the module 100 prevents the removal of the module 100 from the cage 600.

In contrast, with continued reference to FIG. 3A, and with reference also to FIG. 3C, when the retention clip 500 is not attached to the module 100, the protrusions 506 no longer maintain the de-latch slide 300 in a latched position and the de-latch slide 300 can be slid forward to a de-latched position, as shown in FIG. 3C. Sliding the de-latch slide 300 forward to a de-latched position causes the wedges 314 to flex the tabs 610 of the cage 600 outward, thus disengaging the tabs 610 from the shoulders 122 defined in the bottom shell 104. Once the tabs 610 are disengaged from the shoulders 122, the module 100 can be removed from the cage 600.

Thus, the example retention mechanism 200 disclosed herein can be used to retain the module 100 with a cage 600 of a host device (not shown). The example retention mechanism 200 disclosed herein can also include visible indicators, as disclosed herein, in order to provide information concerning one or more characteristics of the module 100. The example retention mechanism 200 can be thus employed without requiring the elimination of the de-latch slide 300 and its favorable EMI containment characteristics.

The present invention may be embodied in other specific forms without departing from its spirit or essential characteristics. The described embodiments are to be considered in all respects only as illustrative and not restrictive.

What is claimed is:

1. An optoelectronic module retention clip, comprising:

a base;

first and second arms extending from the base; and a protrusion extending from the first arm, the protrusion configured to engage a first complementary structure defined in a de-latch slide and a second complementary structure defined in an optoelectronic module shell with a first distal portion of the protrusion positioned proximate a first distal portion of the first complementary structure and a second distal portion of the protrusion simultaneously positioned proximate a second distal portion of the first complementary structure so as to prevent forward and backward motion of the de-latch slide relative to the shell along a z axis of the optoelectronic module.

2. The optoelectronic module retention clip as recited in claim 1, wherein the optoelectronic module retention clip is a substantially monolithic component and further comprising a second protrusion extending from the second arm.

3. The optoelectronic module retention clip as recited in claim 2, wherein the optoelectronic module retention clip is formed from one of PA66, amorphous thermoplastic polyetherimide (PEI), polycarbonate, or ABS.

4. An optoelectronic module retention clip comprising:

a base;

first and second arms extending from the base;

a protrusion extending from the first arm, the protrusion configured to engage a first complementary structure defined in a de-latch slide and a second complementary structure defined in an optoelectronic module shell with a first distal portion of the protrusion positioned proximate a first distal portion of the first complementary structure and a second distal portion of the protrusion simultaneously positioned proximate a second distal portion of the first complementary structure so as to prevent forward and backward motion of the de-latch slide relative to the shell along a z axis of the optoelectronic module; and a visible indicator included on at least a portion of the base or one of the arms that indicates information concerning a characteristic of the optoelectronic module.

5. The optoelectronic module retention clip as recited in claim 4, wherein the optoelectronic module retention clip is a substantially monolithic component and further comprising a second protrusion extending from the second arm.

6. The optoelectronic module retention clip as recited in claim 5, wherein the optoelectronic module retention clip is formed from one of PA66, amorphous thermoplastic polyetherimide (PEI), polycarbonate, or ABS.

7. The optoelectronic module retention clip as recited in claim 4, wherein the visible indicator comprises a color.

8. The optoelectronic module retention clip as recited in claim 4, wherein the visible indicator comprises one or more characters.

9. The optoelectronic module retention clip as recited in claim 4, wherein the characteristic of the optoelectronic module includes one of data rate, wavelength, communication protocol, form factor, manufacturer, or vendor of the optoelectronic module.

10. The optoelectronic module retention clip as recited in claim 4, wherein the visible indicator further indicates information concerning one or more additional characteristics of the optoelectronic module.

11. The optoelectronic module retention clip as recited in claim 4, further comprising an additional visible indicator that corresponds to information concerning an additional characteristic of the optoelectronic module.

12. An optoelectronic module comprising:

a shell;

a transmit port defined in the shell;

a receive port defined in the shell; and a retention mechanism comprising:

a de-latch slide slidably attached to the shell, the de-latch slide having a latched position and a de-latched position, such that when the de-latch slide is moved to the de-latched position, one or more wedges of the de-latch slide are configured to disengage retention tabs of a cage of a host device from corresponding engagement structures of the shell; and a retention clip comprising:

a base;

first and second arms extending from the base; and a protrusion extending from the first arm, the protrusion engaged with a first complementary structure defined in the de-latch slide and a second complementary structure defined in the shell so as to:

maintain the de-latch slide in the latched position, prevent the retention clip from being rotated relative to the shell, and prevent forward and backward motion of the de-latch slide relative to the shell along a z axis of the optoelectronic module.

13. The optoelectronic module as recited in claim 12, wherein the retention clip is a substantially monolithic component and further comprising a second protrusion extending from the second arm.

14. The optoelectronic module as recited in claim 13, wherein the retention clip is formed from one of PA66, amorphous thermoplastic polyetherimide (PEI), polycarbonate, or ABS.

15. The optoelectronic module as recited in claim 12, wherein the retention clip further comprises a visible indicator included on at least a portion of the base or one of the arms that indicates information concerning a characteristic of the optoelectronic module.

16. The optoelectronic module as recited in claim 15, wherein the visible indicator comprises a color.

17. The optoelectronic module as recited in claim 15, wherein the visible indicator comprises one or more characters.

18. The optoelectronic module as recited in claim 15, wherein the characteristic of the optoelectronic module includes one of data rate, wavelength, communication protocol, form factor, manufacturer, or vendor of the optoelectronic module.

19. The optoelectronic module as recited in claim 15, wherein the retention clip further comprises an additional visible indicator that corresponds to information concerning an additional characteristic of the optoelectronic module.

20. The optoelectronic module as recited in claim 12, wherein the optoelectronic module is substantially compliant with the XFP MSA.

21. The optoelectronic module retention clip as recited in claim 1, wherein the protrusion is further configured to engage the first complementary structure and the second complementary structure so as to prevent the retention clip from being rotated relative to the shell.

22. The optoelectronic module retention clip as recited in claim 4, wherein the protrusion is further configured to engage the first complementary structure and the second complementary structure so as to prevent the retention clip from being rotated relative to the shell.

23. The optoelectronic module as recited in claim 12, wherein the protrusion further engages with the first complementary structure and the second complementary structure with a first distal portion of the protrusion positioned proximate a first distal portion of the first complementary structure and a second distal portion of the protrusion simultaneously positioned proximate a second distal portion of the first complementary structure.

24. An optoelectronic module retention clip, comprising:

a base;

first and second arms extending from the base; and means for preventing the base and arms from rotating relative to a shell of an optoelectronic module to which the retention clip is attached.

25. The optoelectronic module as recited in claim 24, wherein the means for preventing the base and arms from rotating comprises a protrusion extending from the first arm, the protrusion configured to engage a first complementary structure defined in a de-latch slide of the optoelectronic module and a second complementary structure defined in a shell of the optoelectronic module with a first distal portion of the protrusion positioned proximate a first distal portion of the first complementary structure and a second distal portion of the protrusion simultaneously positioned proximate a second distal portion of the first complementary structure so as to prevent forward and backward motion of the de-latch slide relative to the shell along a z axis of the optoelectronic module.

26. The optoelectronic module as recited in claim 25, further comprising:

a visible indicator included on at least a portion of the base or one of the arms that indicates information concerning a characteristic of the optoelectronic module; and a second protrusion extending from the second arm, the second protrusion identical in form and function to the protrusion.

* * * * *